(12) United States Patent
Heath et al.

(10) Patent No.: US 7,905,722 B1
(45) Date of Patent: Mar. 15, 2011

(54) CONTROL OF AN ADJUSTABLE SECONDARY AIR CONTROLLER FOR A BURNER

(76) Inventors: Rodney T. Heath, Farmington, NM (US); Forrest D. Heath, Katy, TX (US); Gary Heath, Farmington, NM (US)

( * ) Notice: Subject to any disclaimer, the term of this patent is extended or adjusted under 35 U.S.C. 154(b) by 109 days.

(21) Appl. No.: 11/064,253

(22) Filed: Feb. 22, 2005

Related U.S. Application Data

(63) Continuation-in-part of application No. 10/419,004, filed on Apr. 18, 2003, now Pat. No. 6,984,257, which is a continuation-in-part of application No. 10/071,721, filed on Feb. 8, 2002, now Pat. No. 6,551,379.

(60) Provisional application No. 60/560,922, filed on Apr. 8, 2004, provisional application No. 60/648,322, filed on Jan. 28, 2005.

(51) Int. Cl.
*F23N 1/02* (2006.01)
*F24H 9/20* (2006.01)

(52) U.S. Cl. .......................................... 431/12; 236/11

(58) Field of Classification Search .................... 431/12, 431/18, 19, 75, 6; 236/11, 15 BD, 15 BG
See application file for complete search history.

(56) References Cited

U.S. PATENT DOCUMENTS

| | | |
|---|---|---|
| 844,694 A | 2/1907 | Smith |
| 1,903,481 A | 4/1933 | Schweisthal |
| 2,225,959 A | 12/1940 | Miller |
| 2,726,729 A | 12/1955 | Williams |
| 2,765,872 A | 10/1956 | Hartman et al. |
| 2,786,543 A | 3/1957 | Hayes et al. |
| 2,812,827 A | 11/1957 | Worley et al. |
| 2,815,901 A | 12/1957 | Hale |
| 2,853,149 A | 9/1958 | Gosselin |
| 2,984,360 A | 5/1961 | Smith |
| 3,027,651 A | 4/1962 | Nerge |
| 3,094,574 A | 6/1963 | Glasgow et al. |
| 3,152,753 A | 10/1964 | Adams |
| 3,182,434 A | 5/1965 | Fryar |
| 3,237,847 A | 3/1966 | Wilson |
| 3,254,473 A | 6/1966 | Fryar et al. |
| 3,288,448 A | 11/1966 | Patterson |
| 3,321,890 A | 5/1967 | Barnhart |

(Continued)

FOREIGN PATENT DOCUMENTS

CA 2281610 6/2004

OTHER PUBLICATIONS

"Natural Gas Dehyration", *The Environmental Technology Verification Program*, (Sep. 2003).

(Continued)

*Primary Examiner* — Kenneth B Rinehart
*Assistant Examiner* — Chuka C Ndubizu
(74) *Attorney, Agent, or Firm* — Deborah A. Peacock; Justin R. Jackson; Peacock Myers, P.C.

(57) ABSTRACT

The present invention relates to a system and method for controlling a burner's adjustable secondary air controller. Specifically, the system relates to a control logic for the control of an air supply to a burner such as a natural gas burner used in the production and/or processing of liquid and gaseous petroleum products and in natural gas dehydration systems.

12 Claims, 5 Drawing Sheets

U.S. PATENT DOCUMENTS

| | | | |
|---|---|---|---|
| 3,347,019 A | | 10/1967 | Barnhart |
| 3,360,127 A | | 12/1967 | Wood, Jr., |
| 3,396,512 A | | 8/1968 | McMinn et al. |
| 3,398,723 A | * | 8/1968 | Smalling .................. 122/356 |
| 3,407,052 A | | 10/1968 | Huntress et al. |
| 3,528,758 A | * | 9/1970 | Perkins ..................... 431/67 |
| 3,540,821 A | * | 11/1970 | Levine et al. ............. 431/116 |
| 3,541,763 A | | 11/1970 | Heath |
| 3,589,984 A | | 6/1971 | Reid |
| 3,648,434 A | | 3/1972 | Graves, III et al. |
| 3,659,401 A | | 5/1972 | Giammarco |
| 3,672,127 A | | 6/1972 | Mayse et al. |
| 3,736,725 A | | 6/1973 | Alleman et al. |
| 3,829,521 A | | 8/1974 | Green |
| 3,855,337 A | | 12/1974 | Foral, Jr. et al. |
| 3,949,749 A | * | 4/1976 | Stewart .................. 128/204.24 |
| 3,989,487 A | | 11/1976 | Peterson |
| 4,010,009 A | | 3/1977 | Moyer |
| 4,010,065 A | | 3/1977 | Alleman |
| 4,162,145 A | | 7/1979 | Alleman |
| 4,270,938 A | | 6/1981 | Schmidt et al. |
| 4,332,643 A | | 6/1982 | Reid |
| 4,342,572 A | | 8/1982 | Heath |
| 4,362,462 A | | 12/1982 | Blotenberg |
| 4,396,371 A | * | 8/1983 | Lorenz et al. .................. 431/90 |
| 4,402,652 A | | 9/1983 | Gerlach et al. |
| 4,421,062 A | | 12/1983 | Padilla, Sr. |
| 4,431,433 A | | 2/1984 | Gerlach et al. |
| 4,459,098 A | * | 7/1984 | Turek et al. .................. 431/12 |
| 4,474,549 A | * | 10/1984 | Capone ........................ 431/12 |
| 4,511,374 A | | 4/1985 | Heath |
| 4,568,268 A | * | 2/1986 | Gerlach et al. .................. 431/90 |
| 4,579,565 A | | 4/1986 | Heath |
| 4,588,372 A | * | 5/1986 | Torborg ........................ 431/78 |
| 4,588,424 A | | 5/1986 | Heath et al. |
| 4,659,344 A | | 4/1987 | Gerlach et al. |
| 4,676,806 A | | 6/1987 | Dean et al. |
| 4,689,053 A | | 8/1987 | Heath |
| 4,701,188 A | | 10/1987 | Mims |
| 4,780,115 A | | 10/1988 | Ranke |
| 4,830,580 A | | 5/1989 | Hata et al. |
| 4,919,777 A | | 4/1990 | Bull |
| 4,949,544 A | | 8/1990 | Hines |
| 4,978,291 A | * | 12/1990 | Nakai ............................ 431/12 |
| 5,080,802 A | | 1/1992 | Cairo, Jr. et al. |
| 5,084,074 A | | 1/1992 | Beer et al. |
| 5,129,925 A | | 7/1992 | Marsala et al. |
| 5,130,078 A | | 7/1992 | Dillman |
| 5,163,981 A | | 11/1992 | Choi |
| 5,167,675 A | | 12/1992 | Rhodes |
| 5,195,587 A | | 3/1993 | Webb |
| 5,209,762 A | | 5/1993 | Lowell |
| 5,249,739 A | * | 10/1993 | Bartels et al. ............. 236/15 BR |
| 5,346,537 A | | 9/1994 | Lowell |
| 5,453,114 A | | 9/1995 | Ebeling |
| 5,490,873 A | | 2/1996 | Behrens et al. |
| 5,536,303 A | | 7/1996 | Ebeling |
| 5,664,144 A | | 9/1997 | Yanai et al. |
| 5,766,313 A | | 6/1998 | Heath |
| 5,857,616 A | * | 1/1999 | Karnoff et al. .................. 236/44 A |
| 5,885,060 A | | 3/1999 | Cunkelman et al. |
| 6,004,380 A | | 12/1999 | Landreau et al. |
| 6,010,674 A | | 1/2000 | Miles et al. |
| 6,023,003 A | | 2/2000 | Dunning et al. |
| 6,027,311 A | | 2/2000 | Hill et al. |
| 6,095,793 A | * | 8/2000 | Greeb ........................ 431/12 |
| 6,183,540 B1 | | 2/2001 | Thonsgaard |
| 6,238,461 B1 | | 5/2001 | Heath |
| 6,332,408 B2 | * | 12/2001 | Howlett et al. ............. 110/189 |
| 6,364,933 B1 | | 4/2002 | Heath |
| 6,533,574 B1 | * | 3/2003 | Pechoux ...................... 431/90 |
| 6,537,349 B2 | | 3/2003 | Choi et al. |
| 6,551,379 B2 | | 4/2003 | Heath |
| 6,616,731 B1 | | 9/2003 | Hillstrom |
| 6,984,257 B2 | | 1/2006 | Heath et al. |
| RE39,944 E | | 12/2007 | Heath |
| 7,531,030 B2 | | 5/2009 | Heath et al. |
| 2004/0186630 A1 | * | 9/2004 | Shier et al. ................ 700/301 |
| 2005/0266362 A1 | * | 12/2005 | Stone et al. .................... 431/18 |
| 2007/0151292 A1 | | 7/2007 | Heath et al. |
| 2007/0186770 A1 | | 8/2007 | Heath et al. |

OTHER PUBLICATIONS

Archer, Phil, "TEG Regenerator Vapor Recovery in Amoco's Northwestern Business Unit", *Amoco Northwestern Business Unit*, (Aug. 1992).

Reid, Laurance S., "Coldfinger An Exhauster for Removing Trace Quantities of Water from Glycol Solutions Used for Gas Dehydration", *Ball-Reid Engineers, Inc.*, Oklahoma City, Oklahoma, (1975), 592-602.

* cited by examiner

CONTROL OF AN ADJUSTABLE SECONDARY AIR CONTROLLER FOR A BURNER

CROSS-REFERENCE TO RELATED APPLICATIONS

This application claims the benefit of the filing of U.S. Provisional Patent Application Ser. No. 60/560,922, entitled "Burner with Control Logic and Adjustable Variable Secondary Air Controller", filed Apr. 8, 2004, and U.S. Provisional Patent Application Ser. No. 60/648,322, entitled "Control Logic and Adjustable Secondary Air Controller", filed Jan. 28, 2005, and the specifications thereof are incorporated herein by reference. This application is a continuation-in-part of U.S. patent application Ser. No. 10/419,004, entitled "Natural Gas Dehydrator and System", filed Apr. 18, 2003, which is a continuation-in-part application of U.S. Pat. No. 6,551,379, entitled "Apparatus for Use with a Natural Gas Dehydrator", filed on Feb. 8, 2002, and the specifications and claims of both are incorporated herein by reference. This application is also related to U.S. Pat. No. 4,568,268, entitled "Burner with Variable Secondary Air Controller", issued on Feb. 4, 1986, and the specification and claims thereof are incorporated herein by reference.

BACKGROUND OF THE INVENTION

1. Field of the Invention (Technical Field)

The present invention relates to a system and method for controlling a burner's adjustable secondary air controller. Specifically, the system relates to a control logic for the control of an air supply to a burner such as a natural gas burner used in the production and/or processing of liquid and gaseous petroleum products and in natural gas dehydration systems.

2. Background Art

Burners are used for various applications such as, for example, the production and/or processing of liquid and gaseous petroleum products. However, the typical burner with no variable air controller utilizes an excessive amount of air and oxygen, and such use is inefficient and wasteful since that excessive, unnecessary air is heated.

To increase efficiency, the variable air controller described in U.S. Pat. No. 4,568,268, was directed to controlling the total air flowing into the burner housing as a function of the pressure of the natural gas supplied to the burner. That air controller regulates the amount of air, and thus the desired 3% to 5% excess oxygen, and achieves a significant savings of fuel gas. In addition to allowing a primary supply of air which is always available, the secondary air controller controls the overall excess oxygen by controlling only a secondary air flow. Therefore, that air controller allows regulation of the air fuel ratio over the firing range for 3% to 5% of excess air.

However, the air controller of U.S. Pat. No. 4,568,268 is prone to several problems. When the burner is at a low firing condition or completely off, many times low stack temperatures, as a result of reducing the air flow in the stack, resulted in stack sweating. Stack sweating was, at times, severe enough to cause water to flow back through the firetube and out of the breech of the flame arrestor. When the burner is off and the secondary air controller is closed, there is insufficient oxygen in the firetube to support firing of the main burners. When the process calls for heat, the main burners will begin firing before the secondary air controller can open creating a lack of oxygen and minor explosions in the firetube. The minor explosions are commonly referred to as "wolfing".

Also, the use of throttling thermostats, which are preferable in many applications, can create firing problems when the heat requirements for the process are low and the gas pressure to the burner is below the pressure required to create the gas velocity needed to properly draw and mix the primary air in the burner venture.

It is also difficult to adjust that air controller. Adjustment of the secondary air controller involves a trial and error changing of the compression springs which oppose the movement of the diaphragm on the secondary air controller. Differences in firetube size, altitude, gas composition, etc. requires adjustment of the secondary air controller. The adjustment entails firing the burner and analyzing the stack gases. If the stack gases do not meet the requirements, the burners are shut down, the compression springs are changed, the burner is relit, and the stack gases are again analyzed. The process of firing analyzing and changing compression springs is continued until the right composition of stack gases is obtained. Getting the correct compressions springs installed has proven to be, at times, a long and difficult task.

BRIEF SUMMARY OF THE INVENTION

The present invention comprises a system for controlling a secondary air controller of a heating apparatus comprising a control logic for controlling flow of fuel to the heating apparatus and controlling the opening of a valve of the secondary air controller. The control logic preferably comprises a plurality of lines for communicating signals, a plurality of relays connected to the lines, and at least one controller to send a pressure signal to the relays, and the relays activate the flow of fuel and the opening of a valve of the secondary air controller.

The control logic preferably further comprises a permission start control linking at least one fuel valve and at least one relay. The system preferably comprises a stack temperature control linked to the valve of the secondary air controller. The system preferably comprises a biasing relay providing adjustment to regulate pressure to a diaphragm of the secondary air controller. The system preferably comprises a trimming air control valve to control introduction of air into a fire tube of the heating apparatus. The trimming air control valve is preferably linked to an accumulator and responds to an increase in pressure within the accumulator.

The present invention also comprises a method for controlling a secondary air controller of a heating apparatus comprising the steps of controlling flow of fuel to the heating apparatus via a control logic and controlling opening of a valve of the secondary air controller via the control logic. The method also comprises the control logic communicating signals via a plurality of lines, connecting a plurality of relays to the lines, controlling the flow of fuel and the opening of a valve of the secondary air controller via the relays and the lines, and sending a pressure signal to the relays via at least one controller.

The method further comprises providing a permission start control and linking at least one fuel valve and at least one relay with the permission to start control. The method also preferably comprises providing a stack temperature control, and linking the stack temperature control to the valve of the secondary air controller. The method preferably comprises adjusting and regulating pressure to a diaphragm of the secondary air controller via a biasing relay.

The method preferably comprises providing a trimming air control valve and controlling introduction of air into a fire tube of the heating apparatus. Preferably, the method comprises linking an accumulator to the trimming air control valve and sending a pressure signal from the accumulator to the trimming air control valve.

A primary object of the present invention is to overcome the problem of stack sweating, lack of oxygen when the burner comes on, and low firing pressure.

A primary advantage of the present invention is that it allows for easy and quick adjustment to the secondary air controller.

Another advantage of the present invention is that it allows for the use of a secondary air controller in a burner utilized in a natural gas dehydration system.

Other objects, advantages and novel features, and further scope of applicability of the present invention are set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Description of the Preferred Embodiments

The present invention comprises a system and method for controlling a burner's adjustable secondary air controller. Specifically, the system comprises a control. The present invention may be used in any burner wherein the control of an air supply to the burner as described herein is desired. Such burners include, but are not limited to, natural gas burners used in the production and/or processing of liquid and gaseous petroleum products.

The preferred embodiment of the invention comprises a control logic to: (1) ensure that the burner gas supply closes when the burner gas pressure lowers to a predetermined pressure and does not open again until the burner gas supply pressure rises above the predetermined pressure or higher; (2) ensure that the air controller is open before the main burners begin firing; and (3) prevent stack temperatures from getting low enough to create stack sweating.

While the present invention may be used in connection with a burner in various types of uses, for purposes of illustration only the following discussion incorporates the burner and air controller described in U.S. Pat. No. 4,568,268.

Figure 1:
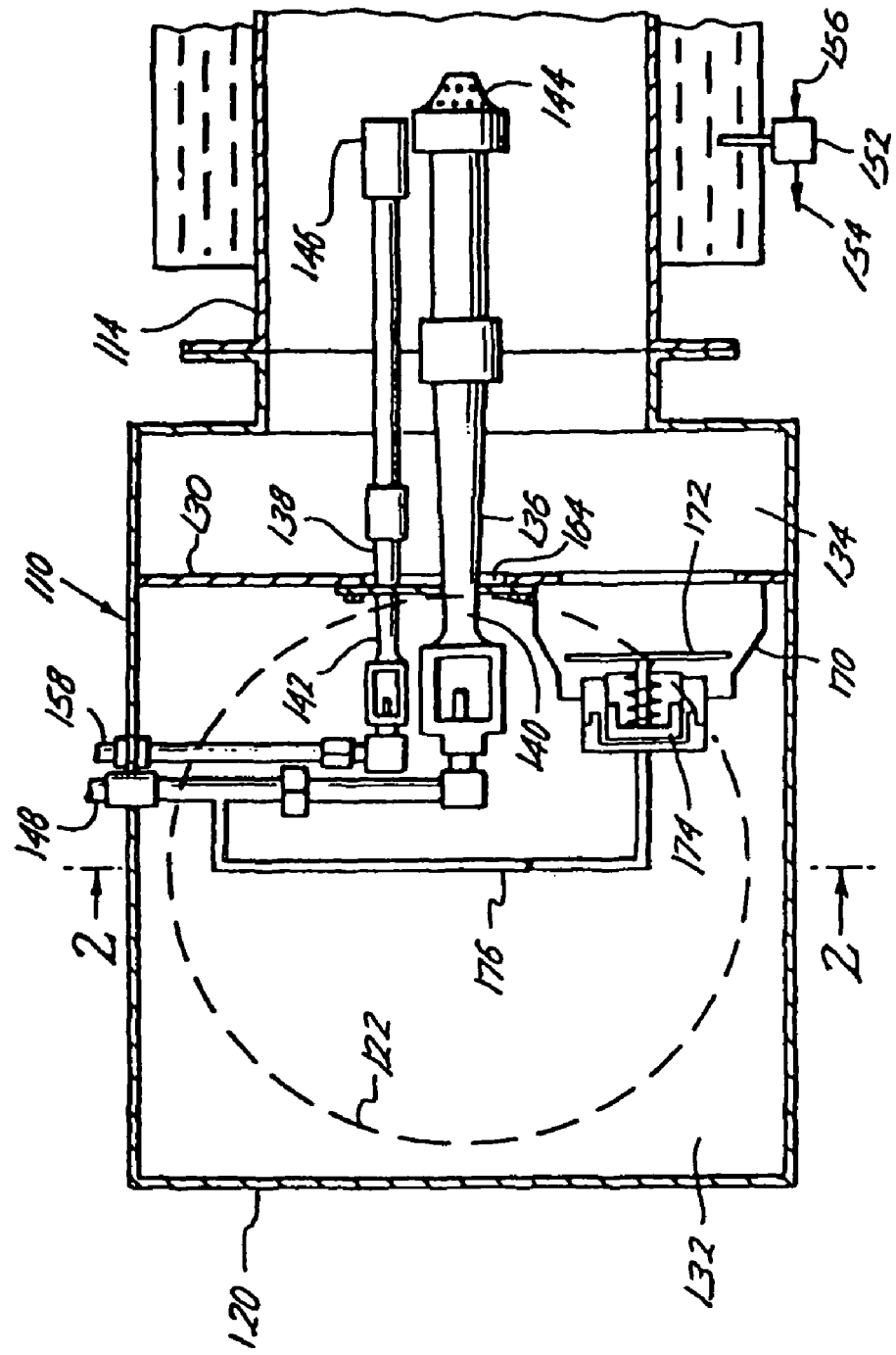
FIG. 1 is an elevational, schematic view of a typical burner heating system described in U.S. Pat. No. 4,568,268.

Referring to FIG. 1, the invention of U.S. Pat. No. 4,568, 268 is directed to a heating apparatus such as burner 110 comprising a housing 120 with atmospheric air inlet 122, preferably including a flame arrestor 124, which is covered by a hood 126 for keeping out debris and/or snow. Baffle 130 in housing 120 separates housing 120 into primary air inlet chamber 132 and combustion chamber 134. Main burner 136 and pilot burner 138 extend through baffle 130. Main burner 136 and pilot burner 138 each includes a metering device such as venturis 140 and 142 for mixing air and fuel and metering devices 140 and 142 are positioned in primary air inlet chamber 132. Main burner 136 and pilot burner 138 each includes burner tips 144 and 146 which are positioned in combustion chamber 134. Therefore, primary air enters combustion chamber 134 and is mixed with the fuel by the metering devices and provides a flame at main burner 136 and pilot burner 138. In addition, adjustable secondary air controller 170 is provided for controlling secondary air so as to optimize the air fuel ratio. Secondary air controller 170 comprises valve 172 positioned between ambient air and combustion chamber 134, and a fuel pressure responsive means such as diaphragm 196 is connected to valve 172 for controlling the amount of secondary air in response to fuel pressure.

Fuel gas is supplied to the main burner venturi 140 by line 148 from on-off valve 150 from motor valve 149. Motor valve 149 automatically regulates the flow of gas to main burner 138 in response to the control of a pneumatic thermostat 152 from a line 154. Gas supply pressure is supplied to thermostat 152 through line 156 which also supplied to burners 136 and 138. Gas for pilot burner 138 is supplied by line 158 through manual on-off valve 160 provided to allow shut-down of pilot 138 when the system is not in operation or to control the gas when pilot 138 is being lighted. Thermostat 152 and motor valve main burner valve 149 may be of either the on-off (snap) type or the throttling type.

Figure 2:
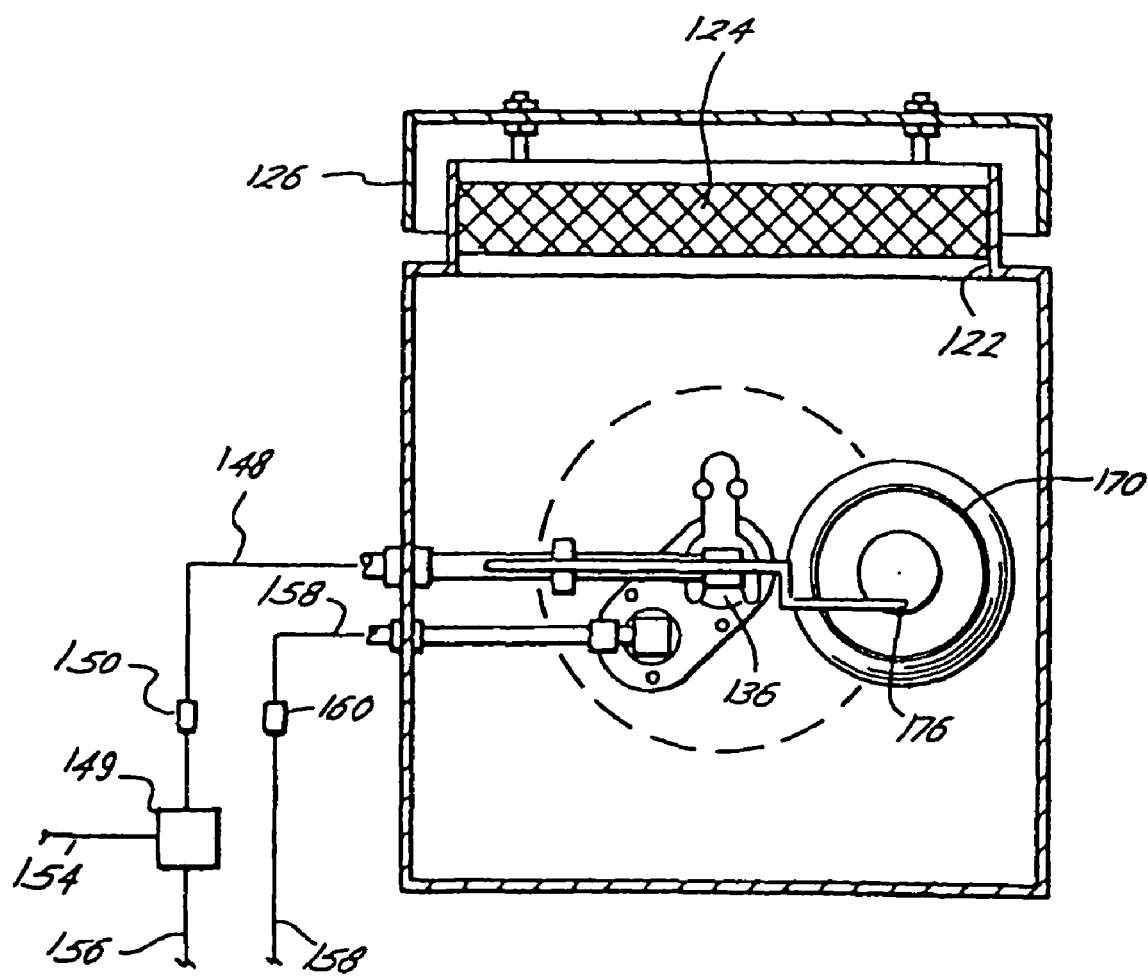
FIG. 2 is a cross-sectional view taken along the line 2-2 of FIG. 1.

Referring to FIG. 2, to regulate the air fuel ratio over the firing range of the burner between 3% to 5% of excess oxygen, secondary air is supplied to combustion chamber 134 through variable air controller 170. Variable air controller 170 is positioned between ambient air and combustion chamber 134 of the burner and is preferably positioned between primary inlet air chamber 132 and the combustion chamber 134 although air controller 170 may receive air in other ways. Air controller 170 includes valve element 172 which is connected to any suitable fuel pressure responsive means 174 for controlling the amount of secondary air supplied to combustion chamber 134 in response to the fuel pressure. Thus, pressure responsive means 174 may be connected to line 176 which in turn is connected to fuel line 148.

Figure 3:
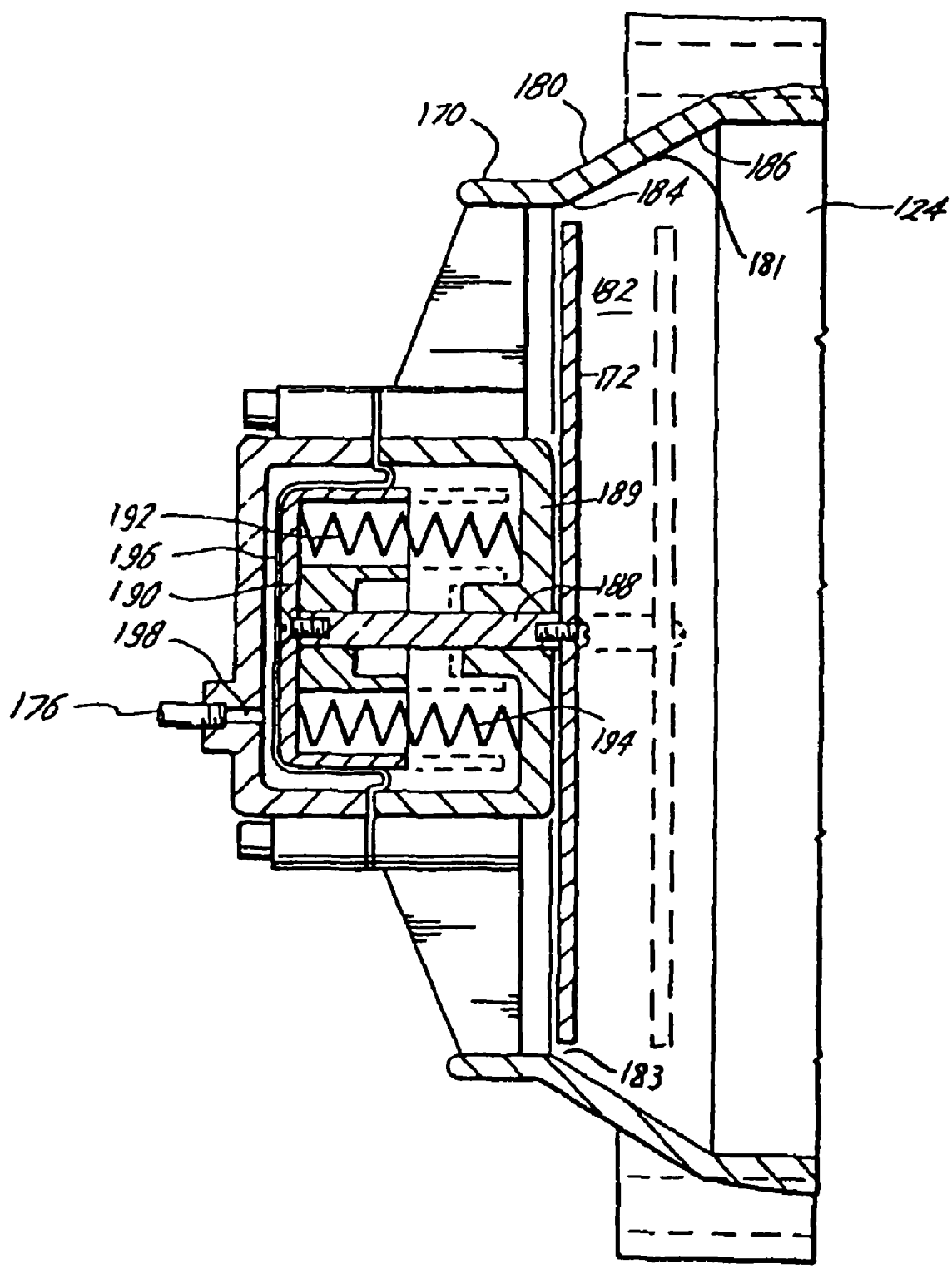
FIG. 3 is an enlarged, cross-sectional view of the variable air controller of U.S. Pat. No. 4,568,268.

Air controller 170 of U.S. Pat. No. 4,568,268 is shown in more detail in FIG. 3. Air controller 170 automatically adjusts and controls the secondary supply of air flow to achieve the desired excess oxygen amount. Air controller 170 includes body 180 comprising variable size opening 182. Body 180 includes wall 181 which increases in size from a first end 184 to a second end 186 and is preferably tapered. Valve 172, such as a circular plate, is movable in opening 182 for changing the area of gap 183 between wall 181 and the outer edge of plate 172. Preferably, there is an air bypass in plate 172, such as leaving a minimum area open in gap 183, at all times which provides a minimum amount of air flow through air controller 170.

Plate 172 is mounted on a movable rod 188 which is slidable through well 189 of body 180 and secured to wall 190. Suitable biasing means such as one or more springs 192 and 194 are provided between walls 189 and 190 for yieldably urging plate 172 in a direction for reducing the volume of air flow through opening 182. Pressure responsive means, such as a diaphragm 196, is provided in housing 189 and on wall 190 and connected to valve 172 for moving valve 172 in a direction for increasing the volume of air in response to an increase in the pressure of the fuel. Diaphragm 196 is exposed to a port 198 which is connected to line 176. Therefore, increased pressure fuel acts on diaphragm 196 to move valve 182 towards second end 186 of tapered body 180 for increasing the annular area and increasing the volume of air. The area of valve opening 182 is varied approximately linearly with the pressurized fuel gas.

Additional secondary air for pilot burner 146 enters combustion chamber 134 through opening 164. Adjustment plate 162 provides a minimum area of opening consistent with stable burning of pilot burner 146 and to provide good lighting of the fuel air mixture at main burner tip 144 when main burner 136 is turned on.

When main burner 136 is turned on, additional secondary air is now required for complete combustion and to achieve the desired 3% to 5% excess oxygen. Therefore, valve element 172 in air controller 170 opens and closes in proportion to the fuel gas pressure supplied to main burner 136 to achieve this desired result.

Figure 4:
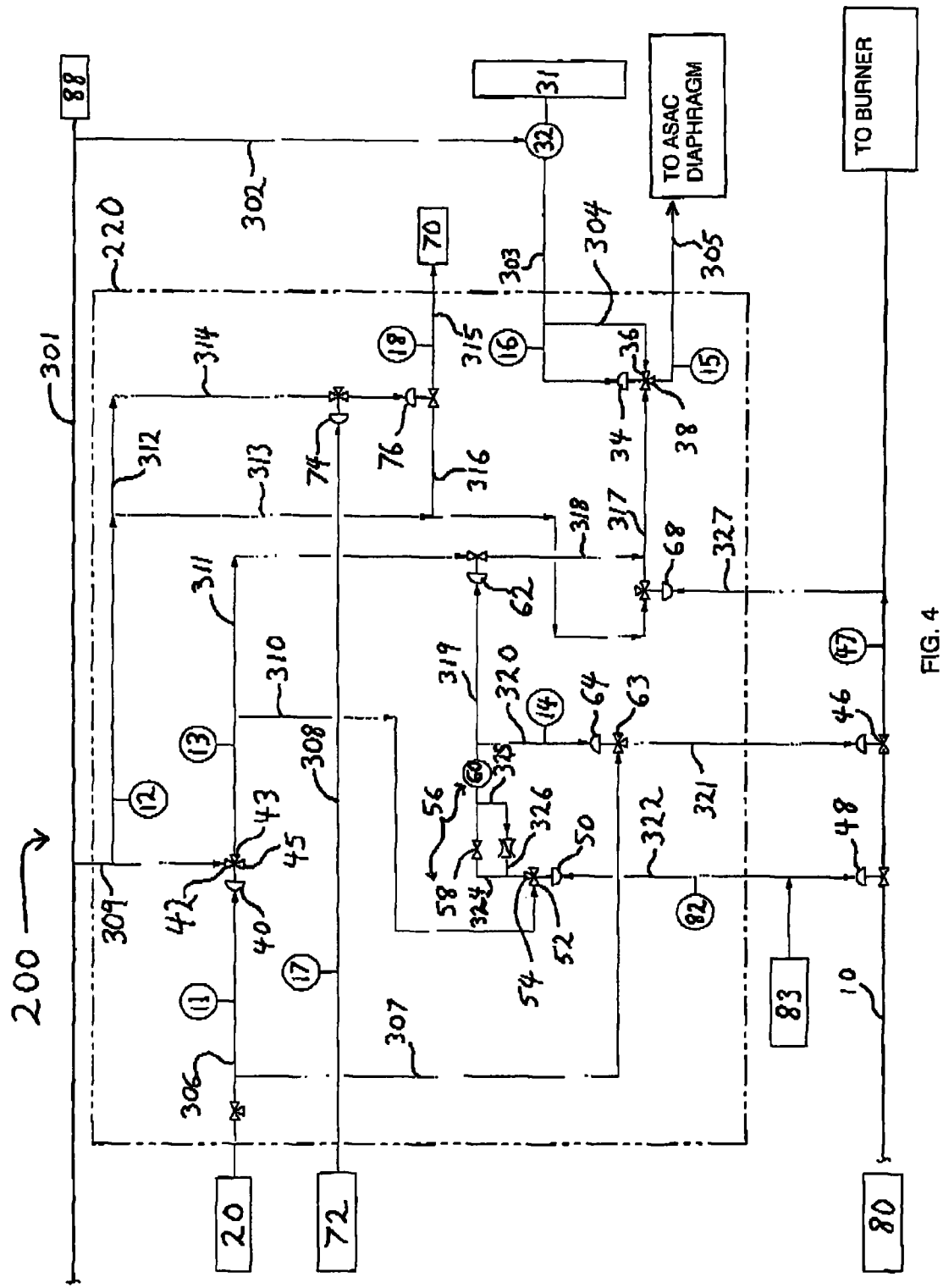
FIG. 4 is a schematic of the control logic of the preferred embodiment of the present invention.

Referring to FIG. 4, control logic 200 of the preferred embodiment of the present invention overcomes the problems of sweating, lack of oxygen when the burner comes on, and low firing pressure. Control logic 200 also preferably provides for adjustment of secondary air controller 170. Control logic 200 preferably comprises control panel 220. Preferably, lines for communicating pressure signals, such as, but not limited to, lines 301-327, are provided which form connections between relays and other components of the system. Preferably, pressure gauges, 11-18, are also provided and disposed along lines 301-327. Instrument air or gas source 88 may be utilized to provide air or gas to control logic 200. If source 88 is utilized, control panel 220 is preferably vented to a safe location (not shown).

In the preferred embodiment, control panel 220 comprises a permission to start control feature 83. Control panel 220 preferably comprises at least one alarm 82 that informs an operator of any type of failure in the burner firing system (e.g., that the pilot light is no longer burning). When control panel 220 senses some type of alarm condition in the firing system, control panel 220 preferably shuts the firing system down until the problem or problems causing activation of alarm 82 have been corrected, and a permission to start signal has been sent to burner 110 and/or control logic 200. For example, once the pilot light (not shown) is relit, the operator can clear the alarm but the burner system will not restart until a permission to start signal has been sent to burner 110 and/or control logic 200.

Alarm 82 preferably vents the pressure signal shown as permission to start and causes valve 48 to close thereby stopping the flow of fuel to the burner and causing three-way pressure relay 50 to shift thereby venting the supply pressure so temperature control valve 46 cannot open. Also, normally opened pressure relay 62 is opened sending a pressure signal to fully open secondary air control valve 172 (shown in FIG. 3). Opening air control valve 172 purges fire tube 114 (shown in FIG. 1) and establishes conditions where the pilot light (not shown) can be safely relit.

In the preferred embodiment, during cold start, air control valve 172 will preferably be wide open as throttling thermostat stack low temperature control 32 is cold and outputting a maximum signal of preferably between approximately 20 and 25 psig to relay 34. Relay 34 preferably communicates from thermostat stack low temperature control 32 to air control valve 172 via ports 36 and 38.

Process temperature controller 20 may be of any type known in the art and may include, but is not limited to, a throttling thermostat. When temperature controller 20 requests heat, output from temperature controller 20 at a signal of preferably between approximately 20 and 25 psig preferably goes to the diaphragm (not shown) of relay 40 which is adjusted to communicate ports 42 and 44 when the pressure on burner manifold 80 is greater than the minimum burner firing pressure. The firing pressure is preferably indicated by burner fuel manifold gauge 47 preferably located downstream of temperature control valve 46. Relay 40, and other relays described herein, may be of any type known in the art capable of communicating pressure signals and may include, but are not limited to, snap acting switches.

Assuming that burners 136 and 138 (shown in FIG. 1) have a permission to start, valve 48 is preferably open and ports 52 and 54 of snap acting, start permission relay 50 are in communication. Output from snap acting relay 40 preferably activates time delay relay 56, which preferably comprises valve 58 and reservoir 60 through open ports 52 and 54 of start permission relay 50.

Time delay relay 56 preferably allows purging of combustion chamber 134 prior to introduction of fuel to burners 136 and 138. The length of the purge time may be altered by adjustment of valve 58. Valve 58 also preferably comprises an orifice check valve to rapidly vent the lines downstream of valve 58 when start permission relay 50 is vented.

When time delay relay 56 times out, pressure from start permission relay 50 will preferably close relay 62 and activate relay 64 to allow pressure to the diaphragm (not shown) of temperature control valve 46. Fuel will then flow to burners 136 and 138. Because secondary air controller valve 172 is preferably fully open, there is adequate oxygen to support combustion without "wolfing".

Thermostat stack low temperature control 32 will preferably remain in control of air control valve 172 until thermostat stack low temperature control 32 is satisfied and relay 34 preferably switches ports to allow fuel manifold pressure to control air control valve 172 through bias relay 68. Bias relay 68 is preferably adjusted to compensate for fuel conditions including, but not limited to, heat content, site altitude, and stack draft. The adjustment will preferably regulate pressure to air control valve diaphragm 196 (shown in FIG. 3) to provide excess oxygen in the stack exhaust of 2 to 5% across the entire firing range.

Without changing the design of the air control valve 172, biasing relay 68 can be used to overcome the problem of adjusting air control valve 172 to allow for different operating conditions such as altitude, gas composition, stack height, etc. Biasing relay 68 is an apparatus that either increases or decreases a pressure signal and the magnitude of the increase or decrease in the pressure signal can be adjusted. Once the magnitude of the pressure increase or decrease has been set, the magnitude stays fixed until it is manually changed. For example, a burner unit that is firing without enough excess air indicates that springs 192 and 194, which resist the opening of air control valve opening 172, are exerting too great a force against the force created by diaphragm 196 of air control valve 172. The volume of secondary air flowing to burner 110 can be increased by adjusting biasing relay 68 to increase the pressure signal to diaphragm 196 of air control valve 172 thereby increasing the force exerted by diaphragm 196 against the force created by springs 192 and 194 further opening air control valve 172. The magnitude of the increase in force generated by diaphragm 196 would then remain constant throughout the firing pressure range of burner 110.

Referring to FIG. 4, the diaphragm (not shown) of biasing relay 68 is preferably connected to line 10 that supplies fuel to burner 110. Preferably, at all times biasing relay 68 is sensing the fuel pressure going to burner 110. If the amount of secondary air going to burner 110 must be increased or decreased, biasing relay 68 can be adjusted to change the magnitude of the pressure signal going to diaphragm 196 of air control valve 172 thereby either increasing or decreasing air control valve opening 182 in response to burner firing pressure.

The preferred embodiment of the present invention provides for a "warm shutdown". Generally, as process temperature is satisfied (i.e., when the heat output of fire tube 114 exceeds the heat required by the process utilizing burner 110) burners 136 and 138 are turned off at a preset minimum pressure to avoid pressure fluctuations and noise from low fuel pressure to burners 136 and 138. When process temperature controller 20 is satisfied, output to relay 40 and relay 64 declines. When the declining fuel pressure in manifold 80 reaches 1 to 2 psig (or at whatever point burner firing inconsistency occurs), temperature control valve 46 preferably will close as pressure to the diaphragm (not shown) of relay 64 will vent via port 45 of relay 40 (via relay 50). In turn, pressure to the diaphragm (not shown) of temperature control valve 46 will preferably vent through port 63 of relay 64. Relay 62 then preferably returns to its normally open position.

Air control valve 172 then preferably returns to its normally closed position—slightly open at the zero position. For all practical purposes, air flow through idle combustion chamber 134 is now blocked.

Following warm shutdown, startup from idle mode (burners off, process warm) preferably proceeds as follows. As process temperature controller 20 requests heat, output from temperature controller 20 goes to the diaphragm (not shown) of relay 40 which is adjusted to communicate ports 42 and 44 when the pressure on burner manifold 80 is greater than the minimum burner firing pressure. Firing pressure is indicated by burner fuel manifold gauge 47 located downstream of temperature control valve 46.

Assuming that the burners have a permission to start, valve 48 is preferably open and ports 52 and 54 of start permission relay 50 are preferably in communication. Output from relay 40 preferably activates time delay relay 56 through open ports 52 and 54 of start permission relay 50.

Time delay relay 56 preferably allows purging of the combustion chamber prior to introduction of fuel to the burners. The length of the purge time may be altered by adjustment of valve 58.

When time delay relay 56 times out, pressure from start permission relay 50 will preferably close relay 62 and preferably activate relay 64 to allow pressure to the diaphragm (not shown) of temperature control valve 46. Fuel will then flow to the burners.

Air control valve 172 then preferably responds to pressure via relay 62 and relay 66, to put fully open air control valve 172 into purge mode in anticipation of burner ignition. As time delay relay 56 times out, the process preferably reverts to normal operation through bias relay 68.

The preferred embodiment of the present invention also prevents stack 31 from sweating during long idle periods. If the burner system is idle (i.e., no heat is required by the process), and low stack temperature is detected, thermostat stack low temperature control 32 preferably outputs pressure to relay 34 and air control valve 172 will preferably open in response to thermostat stack low temperature control 32. Wide open air control valve 172 will allow air flow to warm stack 31 to prevent sweating by removing heat from the process until process temperature controller 20 detects low process temperatures and begins controlling to initiate the cold start sequence described above.

The preferred embodiment of the present invention also preferably provides for emergency shutdown and restart of burner 110. If burner shutdown valve 48 activates, fuel to the burners is interrupted and start permission relay 50 will close and vent the signal to time delay relay 56 and the diaphragms (not shown) of relay 64 and relay 62. Loss of a permission signal will preferably close temperature control valve 46. Pressure flows to air control valve 172 via relay 62 and relay 66. This pressure preferably drives air control valve 172 to full open position and initiates purging of combustion chamber 134. When the problem causing the shutdown is rectified, burner shutdown valve 48 and start permission relay 50 will preferably reopen and startup will commence for cold startup or startup from idle as described above, depending on the temperature of stack 31 at the time of startup.

In some applications involving a natural gas dehydrator, the volume of gas recovered by the dehydration process will be insufficient to provide all the fuel required for a reboiler, but in other cases involving a natural gas dehydrator, the volume of gas recovered by the process will exceed 60% or more of the fuel required for the reboiler. Utilizing a secondary air controller 170 on a natural gas dehydrator can increase firing efficiency of the reboiler to such an extent that the volume of gas recovered by the process exceeds the volume of fuel required to fire the reboiler, and the excess volume of recovered gas must then be used for other applications or else vented. Therefore, to control the efficiency in combustion chamber 134 so that excess fuel recovered is completely consumed, trimming air control valve 70 is preferably provided as shown in FIG. 4.

Preferably, trimming air control valve is disposed on the same baffle 130 that holds the other air control valves and trimming air control valve 70 is preferably of the same design as the other air control valves. However, the pressure signal to the diaphragm (not shown) of trimming air control valve 70 is supplied by biasing relay; 74 rather than by biasing relay 68 which sends the pressure signals to the other air control valves located on the baffle.

Typically, on a natural gas dehydrator, the gas recovery system is designed to operate at between approximately 15 and 28 psig. As long as the volume of gas recovered by natural gas dehydration process does not exceed the volume of gas required to fire burner 110, the pressure in the recovered gas system will remain at the set pressure (e.g., between approximately 15 and 18 psig) for make-up fuel to begin feeding into the fuel system. If the installation of air controller 172 causes the volume of gas recovered by the natural gas dehydration process to exceed the volume of gas required to fire burner 110, pressure will begin to rise in the recovered gas system. If the volume of recovered gas is enough to fire burner 110 and still cause the pressure in the recovered gas system to rise to, for example, approximately 28 psig, excess gas will be vented.

To prevent the pressure in the recovered gas system from reaching 28 psig, excess fuel is preferably accumulated in accumulator 72 comprising a reservoir such as, for example, a pressure tank. The normal operating pressure of accumulator 72 is preferably approximately 15 psig.

Preferably, in operation, a signal to the diaphragm (not shown) of biasing relay 74 or other type adjustable, throttling pressure pilot coming from accumulator (e.g., a gas recovery separator) 72. At a set point of preferably between approximately 18 and 23 psig, more preferably between approximately 18 and 20 psig pressure in accumulator 72, biasing relay 74 preferably sends a pressure signal to multiplying relay 76. Multiplying relay 76 preferably sends a pressure signal to the diaphragm (not shown) of trimming air control valve 70 thereby opening trimming air control valve 70. Multiplying relay 76 preferably multiplies the signal output of biasing relay 74 by as much as six times or as necessary to provide adequate pressure to open trimming air control valve 70. As trimming air control valve 70 opens, additional air is admitted into fire tube 114 thereby decreasing firing efficiency and causing burner 110 to begin consuming the accumulated fuel. Opening trimming air control valve 70 introduces excess secondary air into fire tube 114 thereby decreasing firing efficiency and causing burner 110 to begin consuming more fuel. Preferably, multiplying relay 76 amplifies pressure from accumulator 72 above the set point pressure to obtain a quick response of trimming air control valve 70. Preferably, the pressure rise in accumulator 72 is limited to from between approximately 1 and 5 psi above the set point.

When the excess fuel in accumulator 72 is consumed and the pressure in accumulator 72 decreases to the set point (e.g., 18 psig) or less, biasing relay 74 and multiplying relay 76 preferably vent the pressure from the diaphragm (not shown) of trimming air control valve 70, and trimming air control valve 70 closes. When trimming air control valve 70 closes, air controller 170 returns to normal operation.

Figure 5:
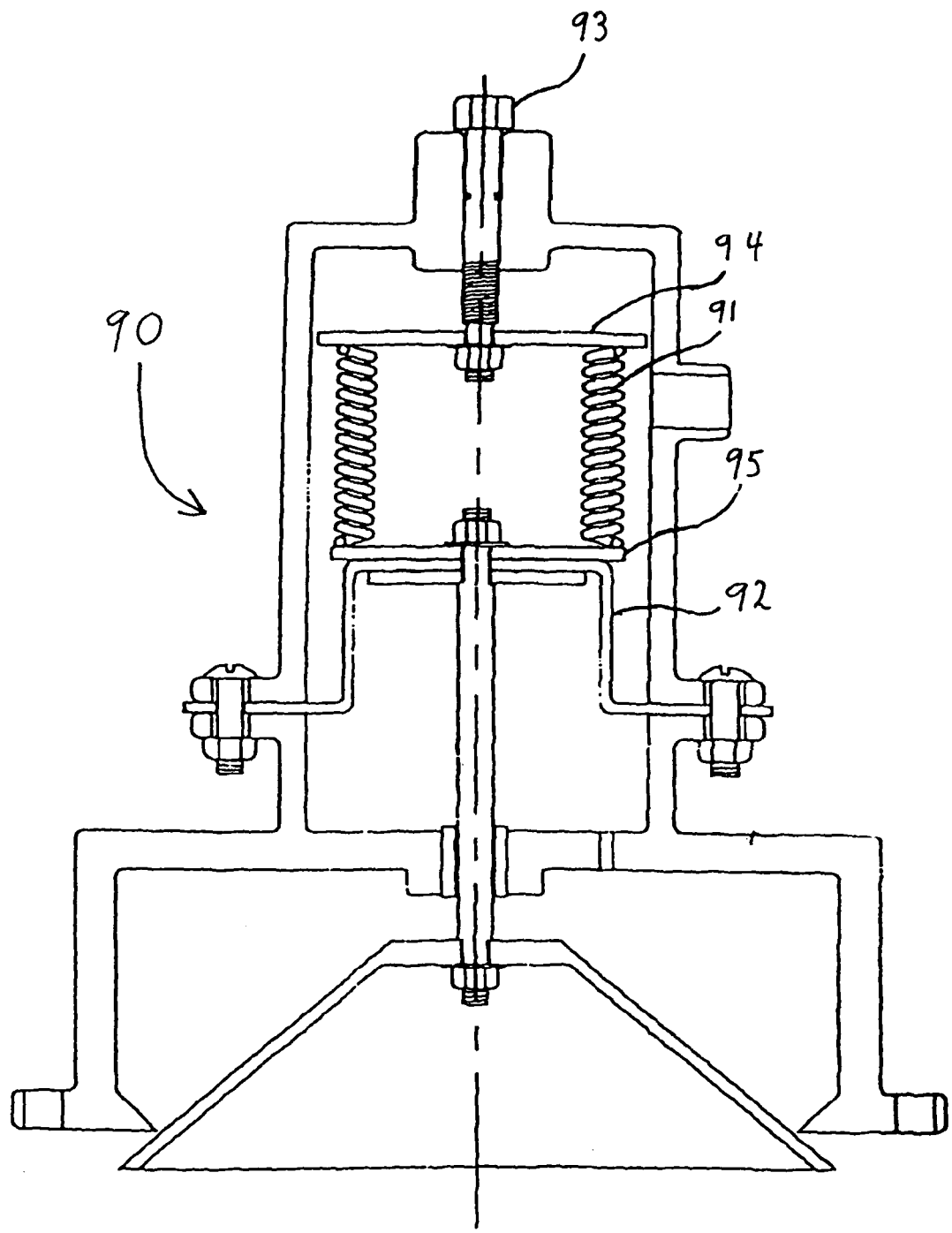
FIG. 5 is an enlarged cross-sectional view of a mechanically adjustable embodiment of a variable air controller of the present invention.

In another embodiment, shown in FIG. 5, the invention may comprise secondary air controller 90 that may be utilized in lieu of biasing relay 68 for adjustment purposes. Secondary air controller 90 preferably comprises tension springs 91 that oppose the movement of diaphragm 92 on secondary air controller 90. This provides, without disassembly of the diaphragm case, for adjustment of the spring tension by simply rotating bolt 93 thus changing the force exerted against diaphragm 92. Bolt 93 is preferably connected to plate 94 which is preferably connected at the top to springs 91. Springs 91 are preferably connected at the bottom to plate 95. Plate 95 is preferably connected to resist the downward movement of diaphragm 92. Without disassembly or shutting off burner 110, the amount of secondary air induced into fire tube 114 can be adjusted, in a real time mode, by preferably turning bolt 93 either clock wise or counter-clock wise to decrease or increase the tension in springs 91.

The preceding examples can be repeated with similar success by substituting the generically or specifically described reactants and/or operating conditions of this invention for those used in the preceding examples.

Although the invention has been described in detail with particular reference to the preferred embodiments in the attachment, other embodiments can achieve the same results. Variations and modifications of the present invention will be obvious to those skilled in the art and it is intended to cover all such modifications and equivalents. The entire disclosures of all references, applications, patents, and publications cited above, and of the corresponding application(s), are hereby incorporated by reference.

What is claimed is:

1. A method for controlling a secondary air controller of a heating apparatus comprising:
providing a pneumatic control circuit, the control circuit pneumatically adjusting the secondary air controller into an open position for a delayed period of time prior to a fuel being provided to a burner of the heating apparatus;
permitting ignition of the heating apparatus only when a pneumatic start permission relay signal is received; and
pneumatically adjusting a position of the secondary air controller based on a pressure of the fuel supplied to a burner of the heating apparatus and based on an output of a pneumatically adjustable biasing relay pneumatically connected to the secondary air controller, the biasing relay increasing or decreasing a signal pressure to a diaphragm of the secondary air controller.

2. The method of claim 1 wherein providing the pneumatic control circuit further comprises connecting and operating the pneumatic control circuit with a fuel gas source.

3. The method of claim 1 further comprising:
providing a stack temperature control;
pneumatically linking the stack temperature control to the pneumatic control circuit; and
maintaining a temperature of stack gases to prevent sweating.

4. The method of claim 1 wherein the secondary air controller comprises an adjustable spring-loaded biasing component.

5. The method of claim 1 further comprising providing a trimming air control valve and controlling introduction of only secondary combustion air into a fire tube of the heating apparatus.

6. A system for controlling secondary air to a heating apparatus comprising:
a secondary air controller, said secondary air controller comprising:
a valve;
a diaphragm in communication with said valve;
a thermostat; and
pneumatic control logic, said logic comprising a pneumatic start permission relay and a pneumatic adjustable biasing relay pneumatically connected to said diaphragm of said secondary air controller said biasing relay increasing or decreasing a signal pressure to said diaphragm.

7. The system of claim 6 wherein said pneumatic control logic further comprises at least one relay which activates a flow of pressurized fuel to the heating apparatus.

8. The system of claim 7 wherein said pneumatic control logic links at least one fuel valve and at least one pneumatic relay.

9. The system of claim 6 further comprising a stack temperature control linked to said valve of said secondary air controller maintaining a temperature of stack gases for the prevention of sweating.

10. The system of claim 6 wherein said pneumatic control logic is operated by a fuel gas.

11. The system of claim 6 further comprising a trimming air control valve to control introduction of secondary combustion air into a fire tube of the heating apparatus.

12. The system of claim 11 wherein said trimming air control valve is in pneumatic communication with a pressure going to a burner of the heating apparatus.

* * * * *